United States Patent
Elliott

(10) Patent No.: US 8,171,469 B2
(45) Date of Patent: May 1, 2012

(54) PACKAGE COMPATIBILITY

(75) Inventor: Ian A. Elliott, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1542 days.

(21) Appl. No.: 11/504,480

(22) Filed: Aug. 15, 2006

(65) Prior Publication Data
US 2008/0127167 A1 May 29, 2008

(51) Int. Cl.
G06F 9/445 (2006.01)
G06F 11/30 (2006.01)

(52) U.S. Cl. ......... 717/174; 717/175; 713/187; 713/191
(58) Field of Classification Search .................. None
See application file for complete search history.

(56) References Cited

U.S. PATENT DOCUMENTS

| | | | |
|---|---|---|---|
| 4,881,264 A | 11/1989 | Merkle | |
| 4,947,430 A | 8/1990 | Chaum | |
| 5,341,426 A * | 8/1994 | Barney et al. | 713/171 |
| 5,638,447 A | 6/1997 | Micali | |
| 5,659,616 A | 8/1997 | Sudia | |
| 6,292,897 B1 | 9/2001 | Gennaro et al. | |
| 6,381,741 B1 | 4/2002 | Shaw | |
| 6,425,011 B1 | 7/2002 | Otani et al. | |
| 6,434,561 B1 | 8/2002 | Durst, Jr. et al. | |
| 6,658,421 B1 | 12/2003 | Seshadri | |
| 6,796,489 B2 | 9/2004 | Slater et al. | |
| 6,807,534 B1 | 10/2004 | Erickson | |
| 6,848,048 B1 | 1/2005 | Holmes | |
| 6,934,956 B1 * | 8/2005 | Allen | 719/327 |
| 6,952,823 B2 | 10/2005 | Kryloff et al. | |
| 6,957,331 B2 | 10/2005 | Kursawe et al. | |
| 6,959,382 B1 | 10/2005 | Kinnis et al. | |
| 7,194,728 B1 * | 3/2007 | Sirota et al. | 717/106 |
| 7,523,452 B1 * | 4/2009 | Kamity et al. | 717/178 |
| 7,735,057 B2 * | 6/2010 | Rachman et al. | 717/100 |
| 2004/0230971 A1 * | 11/2004 | Rachman et al. | 717/175 |
| 2005/0240921 A1 * | 10/2005 | Barker et al. | 717/175 |
| 2008/0216066 A1 * | 9/2008 | Oh | 717/173 |

* cited by examiner

Primary Examiner — Insun Kang

(57) ABSTRACT

One method embodiment includes defining a first package to be opened by a computing device. The method includes associating installation content to be installed on the computing device with the first package. The first package includes a second package that includes the installation content to be installed and the first package includes package functionality information to determine whether a particular package functionality can be utilized by the computing device.

25 Claims, 3 Drawing Sheets

PACKAGE COMPATIBILITY

BACKGROUND

In the field of computing devices, information, in the form of instruction sets, files, programs, libraries, scripts, data and the like are sometimes installed on computing devices in order to add functionality or update the functions available on the device. In some instances, this information can be provided in the form of one or more "packages." These packages have a wide variety of package structures. They can be resident on a computing device or created, copied from one computing device to another, and installed thereon.

In addition to the above-mentioned package installation content (e.g., instruction sets, files, programs), some packages also include their own installation mechanism (e.g. an installer program among other mechanisms). In other instances, installation mechanisms may exist on a computing device, onto which the package is delivered, that can install one or more packages that may or may not be present on the computing device.

Some packages can include package information in the form of meta-data that describes the package installation content, and/or package instructions (e.g., control scripts, and/or configuration files) which may be used during installation of the package. For example, the meta-data may describe the instruction sets within the installation content, and whether a computing device will have to be rebooted when the package is installed.

The package instructions may influence the installation mechanisms with regard to if and how the package is installed on a given computing device. For example, the package instructions may determine that the package can't be installed if the computing device doesn't have at least a certain number of capabilities. The package instructions may also provide customizations and/or functionalities that the installation mechanism cannot perform and/or utilize. For example, the computing device may be running an outdated operating system and/or a prior version of an installation mechanism that may or may not be able to utilize a particular package functionality, such as a security mechanism to provide security functionality to the contents of the package. There are many types of meta-data and package instructions, and those listed above are provided as examples.

In installing such packages, the computing device (e.g., through use of an installation mechanism) typically downloads the package to be installed into the computing device from a memory location. Once on the device, the computing device can execute one or more installation mechanisms to install packages thereon. In some systems, these installation mechanisms can potentially be influenced by the package meta-data and/or package instructions, used therewith on the device. When a package is installed, all or a portion of the package installation content (e.g., instruction sets, files, programs) can be placed on the destination computing device.

However, it is possible to tamper with the package to be installed or the data to be used with the package. The tampering with this information can include, for example, adding, modifying, or removing package meta-data, package instructions, package installers, and/or package contents to be installed, and can cause the computing device to malfunction, make incorrect calculations, and/or initiate functions that were not intended. For example, package instructions can be inserted into the package which can execute to shut down the computing device, destroy data in memory, or send personal information to an unauthorized recipient.

Protection mechanisms have been developed to aid in authenticating packages and/or in reducing the amount of tampering that takes place in these installations. For example, the package (e.g., its package installation content, meta-data, and/or package instructions) can be encrypted with a code to authenticate the package, and/or to determine whether the package has been altered, and/or to restrict access to the package to users possessing a key to decrypt the files.

In some computing systems, a checksum structure is used where the size of the package (e.g., contents, meta-data, and package instructions) is measured and recorded when the package is created, for example, and then the package size is measured at the time of installation. If the package is larger or smaller, then the file may have been tampered with.

In some computing systems, a digital signature can be provided by the creator of the package and this digital signature can ensure that the package has not been altered since the signature was created. In some cases, packages can be locked and/or access to them can be restricted to users with a decryption key.

Some computing devices and/or installation mechanisms do not have the functionality to be able to utilize these security measures. In such instances, the operation of the computing device and/or installation mechanism can be adversely affected. For instance, the installation mechanism can generate an error and/or the installation process can be halted because the mechanism does not know how to interpret the security related instructions and/or other information.

DETAILED DESCRIPTION

Figure 1:
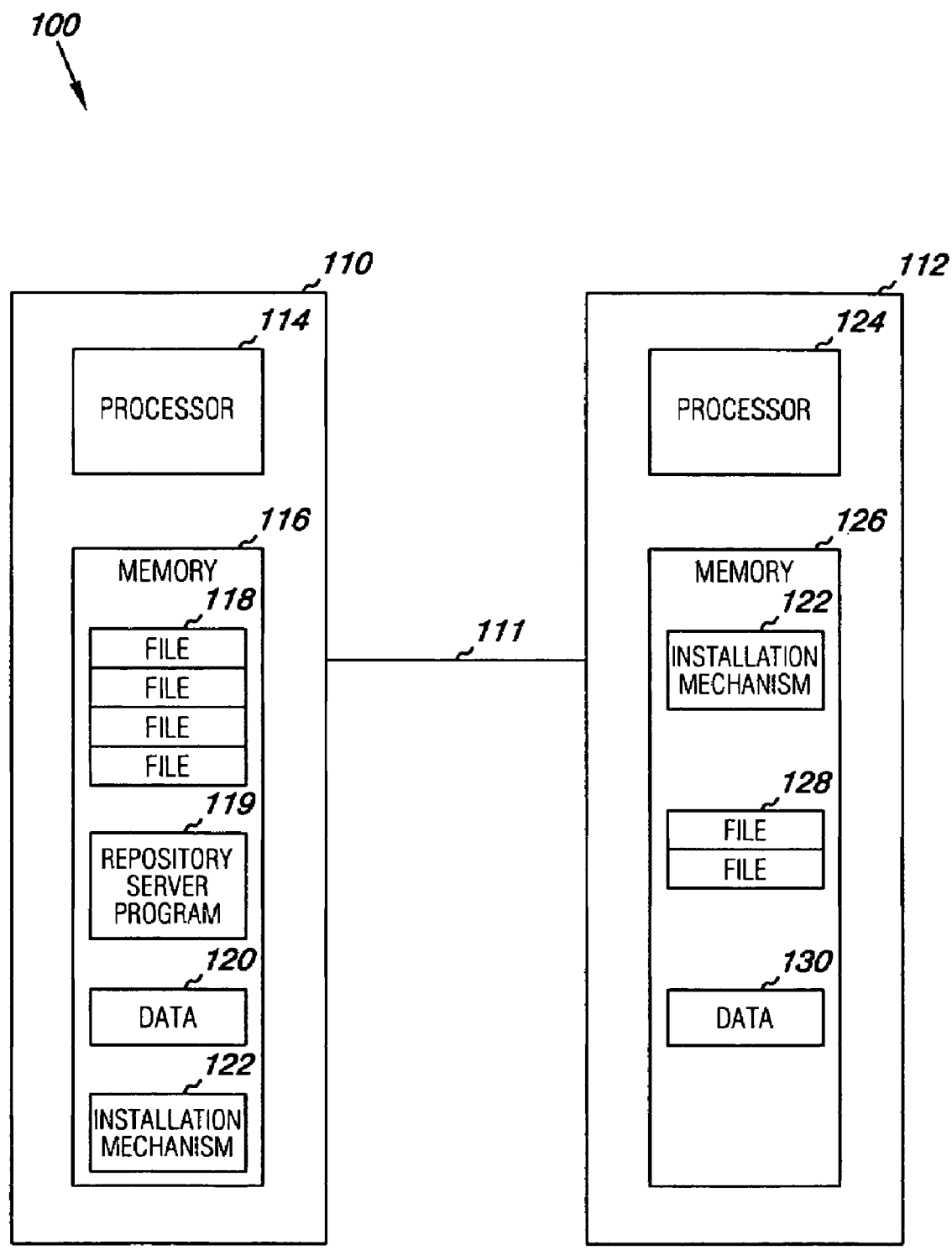
FIG. 1 illustrates an embodiment of a computing system suitable to implement an embodiment of the present disclosure.

Embodiments of the present disclosure include methods, installers, structures, and devices. Some embodiments include logic operable to install packages.

Some embodiments of the present disclosure include logic operable to manage a package repository, which may include a number of directories storing a number of packages. In various embodiments, a repository on one computing device and/or system can store packages that can be installed on one or more other computing devices and/or systems (e.g., over a network). In such embodiments, for example, the installation mechanism may be different on each computing device and/or system.

One method embodiment includes defining a first package to be opened by a computing device. The method includes associating a set of package information with the first package. The first package can include a second package having package installation content to be installed on the computing device and package functionality information to determine whether a particular package functionality can be utilized by the computing device. In various embodiments, the particular package functionality can be a protection mechanism to determine whether the second package has been modified (e.g., whether the contents of the package have been tampered with and/or altered since the package was created, for example). The first package can also have one or more protection mechanisms to determine whether the first package's information has been modified and/or whether the second package has been modified.

The first package and/or the second package can be defined as a compressed package (e.g., a zip file format among other compressed file types). The first package and/or the second package can also include various other archival formats such as a tar file format, for example. The first package and/or the second package can also be defined as a collection of memory locations, files, and/or directories, etc.

In various embodiments, the package can be resident on a source computing device and/or on a destination computing device. A source computing device can include a repository server capable of storing a number of packages thereon. Packages can be designed to access information on a source computing device and/or a destination computing device during execution of the information contained in the package.

In various embodiments, a package installation mechanism (e.g., a computing device and/or installer) may or may not include executable instructions capable of recognizing and/or utilizing a particular functionality. For example, in some embodiments, a computing device and/or installer may or may not include executable instructions capable of utilizing a protection mechanism to identify if the second package and/or the package information have been modified. Therefore, the first package can include package functionality information (e.g., data and/or executable instructions) that can be used by a computing device to determine whether the computing device includes executable instructions to utilize the particular functionality.

For instance, the first package can include package functionality information that can be used by a computing device to determine whether the computing device includes executable instructions to utilize the protection mechanism. In some such embodiments, the protection mechanism can be used to restrict access to the second package.

In various embodiments, the protection mechanism can be used to identify if the second package, its package information, and/or the first package's information has been modified if it is determined that the computing device and/or package installation mechanism has executable instructions to utilize the protection mechanism. In such embodiments, the package installation content can be installed on the computing device if it is determined that the computing device and/or package installation mechanism does not have executable instructions to utilize the protection mechanism. That is, in various embodiments, the second package and/or the package installation content can be installed whether or not the computing device can utilize the protection mechanism.

For example, in various embodiments, the protection mechanism can be a checksum file and/or a digital signature associated with the second package, and with any other portion of the first or second package. In such embodiments, the computing device on which the package installation content are to be installed and/or the package installation mechanism may or may not be able to utilize the protection mechanism.

In various embodiments, a checksum routine can be used to identify if the second package and/or the package installation content have been modified. Checksum routines typically sum the number of bits in data (e.g. the package installation content, the package information). The sum is accessed when the package is to be installed. The package installation content are also re-summed to ascertain whether the number of bits has changed.

In various embodiments, the protection mechanism can be a digital signature of the first and/or second package. As one example, a first checksum can be calculated for the second package and the checksum can be encrypted with a private key (e.g., using a public-key/private-key encryption algorithm) to create the digital signature of the second package. In embodiments in which the computing device and/or the package installation mechanism includes executable instructions to utilize digital signatures, those instructions can be executed to calculate a second checksum, decrypt the encrypted first checksum (e.g., with a public key), and compare the second checksum with the decrypted first checksum. In this example, if the two checksums match (i.e., the digital signature is verified), then the content of the second package can be considered to be unmodified and/or not tampered with.

The present disclosure also includes a number of medium embodiments. The medium embodiments have executable instructions thereon for causing a device to perform a method. Various types of mediums can be utilized. Mediums include computing device readable mediums, such as magnetic and optically readable media.

Instructions, as discussed herein can be single instructions or sets of instructions, such as files, programs, or the like. The executable instructions can be executed by a computing device.

In various embodiments, the method provided in the form of executable instructions on the medium can include defining a first package to be opened by a computing device. The first package can include a second package having package installation content to be installed on the computing device and can include one or more security files to determine whether the first and/or second package (e.g., any part of them or one or both of the packages as a whole) has been modified. The method can also include receiving the first package to the computing device.

In various embodiments, the first package can be received to the computing device from a repository server, e.g., over a computer network such as a local area network (LAN) or wide area network (WAN), among various other computer networks. A repository server can include a number of packages that may or may not include protected package compatibility according to various embodiments of the present disclosure.

In various embodiments, the installation mechanism can include a number of clean up functions. For example, the method can include installing the set of executable instructions on the computing device and deleting the second package once the installation content are installed. In various embodiments, the method can include installing the installation content on the computing device and deleting the first package once the installation content are installed. In some embodiments, the method can include opening the first package to access the second package.

The method can include associating a checksum file with the security file to determine if the second package has been modified. In some embodiments, the method can include reading the checksum file to determine if the first and/or second package has been modified. The method can include reading the checksum file to determine whether the computing device and/or package installation mechanism has executable instructions to utilize the second package. In various embodiments, the method can include installing the set of instructions if the computing device and/or package installation mechanism does not have executable instructions to utilize the security features of the first and/or second package.

The present disclosure also includes a number of package structure embodiments. In such embodiments, the structure can include a first package that includes a second package that includes installation content to be installed on a computing device. The first package can also include package information about the second package, and security information corresponding to the first package information, the second package and/or to the package information about the second package, to determine, for example, whether the second package has been modified.

In some embodiments, the security information is a digital signature of the second package. The security information can include a checksum protocol to determine whether the installation content have been modified. The security information can include information about any given portion of the first and/or second package, to determine whether that part has been modified.

In various embodiments, the first package can include a set of executable instructions to determine whether the security information is usable by the computing device and/or by the package installation mechanism. In such embodiments, the set of executable instructions can be executed to install the second package and/or the installation content on the computing device if it is determined that the security information is unusable by the computing device and/or by the package installation mechanism.

In some embodiments, the first package can include a set of executable instructions that can be executed to determine whether the installation content have been modified by using the security information if it is determined that the security information is usable by the computing device and/or by the package installation mechanism. In such embodiments, the set of executable instructions can be executed to install the installation content on the computing device if it is determined that the first set of executable instructions has not been modified. For example, in embodiments in which the security information includes a digital signature, the first set of executable instructions can be installed on the computing device upon verification of a digital signature. In some embodiments, the security information is used to restrict access to the second package.

The first package can include a set of executable instructions that can be executed, in some embodiments automatically, to install the installation content on the computing device if the computing device and/or the package installation mechanism do not have the capability to use the security information.

The present disclosure also includes a number of installer embodiments. These installer embodiments, can include a set of executable instructions to retrieve a first package having a number of files associated therewith from a memory location. The first package can include a second package having package installation content to be installed on the computing device. The set of executable instructions can include instructions to read package information of the first package to determine whether a computing device and/or package installation mechanism can utilize the security information of the first package. In some embodiments, the set of executable instructions may always look for the security information of the first package, use the security information if it exists, and determine whether to install the second package if the security information does not exist in the first package. In other embodiments, the set of executable instructions can install the second package if the computing device and/or package installation mechanism cannot utilize the security information of the first package.

As discussed further below in connection with FIG. 2, the package information of the first package can include various data and/or instructions (e.g., meta-data and/or control scripts, etc.) for identifying the contents of the first package, for identifying whether the computing device and/or package installation mechanism can utilize the content of the first package (e.g., the security information), and/or for controlling various installation and/or cleanup procedures, among others.

In various embodiments, the security information can be associated with a second package within the first package. In some embodiments, the security information can include a checksum file and/or a digital signature file of the first and/or second package.

In various embodiments, the security information can be associated with each other portion of the first and/or second package, allowing the installer to determine if any other portion of the first and/or second package has been modified. For example, in some embodiments the first package can contain a copy of the second package's information, and the security information can be used to determine if this package information has been tampered with. In such embodiments, the installer may stop the installation process if any portion of the first and/or second package has been modified.

In some embodiments, the first package can include a set of executable instructions to install a particular file on the computing device if it is determined that the security information is unusable by the computing device and/or package installation mechanism. The particular file can be the second package and/or the content thereof. In various embodiments, the set of executable instructions can be a control script of the first and/or second package.

In various embodiments of the present disclosure, the first package can include a set of executable instructions to cause the installer to check the security information to determine if the second package has been modified and install the second package on the computing device if it is determined that the second package has not been modified.

FIG. 1 illustrates an embodiment of a computing system suitable to implement an embodiment of the present disclosure. In the embodiment of FIG. 1, a computing system 100 includes a number of computing devices (e.g., 110 and 112). The computing devices of system 100 can include computers (e.g., desktops and/or laptops) or handheld devices (e.g., cellular telephones personal digital assistants (PDAs), among various other computing devices. Computing system 100 can also be a network (a LAN or a WAN, among other networks) of multiple computing devices.

Computing device 110 contains a processor 114 and memory 116. Within the memory 116 are a number of memory locations 118. These memory locations can contain information, including sets of instructions, files, programs (e.g., software packages), and the like. For example, in the embodiment of FIG. 1, the memory 116 includes a repository server mechanism 119. In the embodiment illustrated in FIG. 1, the memory locations include a number of files and data 120 that can be used with the installation mechanism. The processor 114 can be used to execute instructions including those of the files in memory locations 118.

When package installation content are to be installed on a computing device, a set of instructions (e.g., an installation mechanism) can be provided on the computing system. For example, the installation mechanism can be provided on the source computing device 110 that contains the information to be installed and/or can be provided on the destination computing device 112 in which the information is to be installed. The information can, for example, be provided via connection 111. The connection can be any suitable wired or wireless connection. In some embodiments, the source and destination computing devices can be the same if the package to be installed is already on the destination device.

An installation mechanism (e.g., an installer) can be a set of executable instructions that can be utilized to install the intended information on the destination computing device.

Installation can include accessing the package installation content to be installed, and the package information, on the source computing device, loading the intended information into the memory of the destination computing device, and/or executing instructions and accessing data to accomplish the installation of the intended information on the destination computing device.

In some embodiments, the information can remain on the source computing device and can be accessed by the destination computing device in order to accomplish the installation of the intended information. In some embodiments, a set of instructions and/or data can be transferred from the source computing device to the destination device. The form of the security information and/or the particular type of protection mechanism may influence what and how much should be transferred to the destination device.

In the embodiment of FIG. 1, the destination device 112 includes a processor 124 and memory 126. The memory can be used to store an installation mechanism 122 (e.g., a set of instructions to check package security information, install package installation content and the like). The processor 124 can be utilized to execute the installation instructions and the installed contents upon completion of the installation.

In the embodiment of FIG. 1, the memory 126 includes an installation mechanism 122, a number of instruction sets (e.g., files 128) and data 130 for use with the instructions sets and/or the installation mechanism 122. The installation mechanism 122 can interact with the repository server mechanism 119 in order to transfer information to be installed onto the destination device 112.

In some computing systems, the destination computing device and/or the installer mechanism may not have the capability to utilize a particular package functionality associated with a software package to be installed on a computing device. For example, in some computing systems, the destination computing device and/or the installer mechanism may not have the capability to utilize the security features associated with a software package to determine if the installation content have been modified and/or to restrict access to the installation content. For example, an older version of an operating system may not be capable of reading a file that has 32-bit encryption. As another example, some installer mechanisms may not be configured to recognize digital signatures and/or checksums associated therewith.

In such instances, embodiments of the present disclosure provide a mechanism for the computing device and/or installer mechanism to be able to install the package installation content whether or not a computing device and/or installer mechanism can utilize a particular functionality associated with the package. For example, some embodiments of the present disclosure provide a mechanism for the computing device and/or installer mechanism to be able to install the package installation content without having to use the security mechanisms, e.g., digital signatures, associated therewith. Although the instructions may have been modified and/or tampered with, the option to install the set of instructions can be made by the user of the computing device in order to be able to utilize the package installation content.

In various embodiments, a package structure, as described below in connection with FIG. 2, can be utilized to facilitate use of a particular package functionality such as a security feature by installers which are capable of and/or configured to support such features, while the same package structure can facilitate installation of the intended package installation content by installers which are not capable of and/or not configured to support such features.

Figure 2:
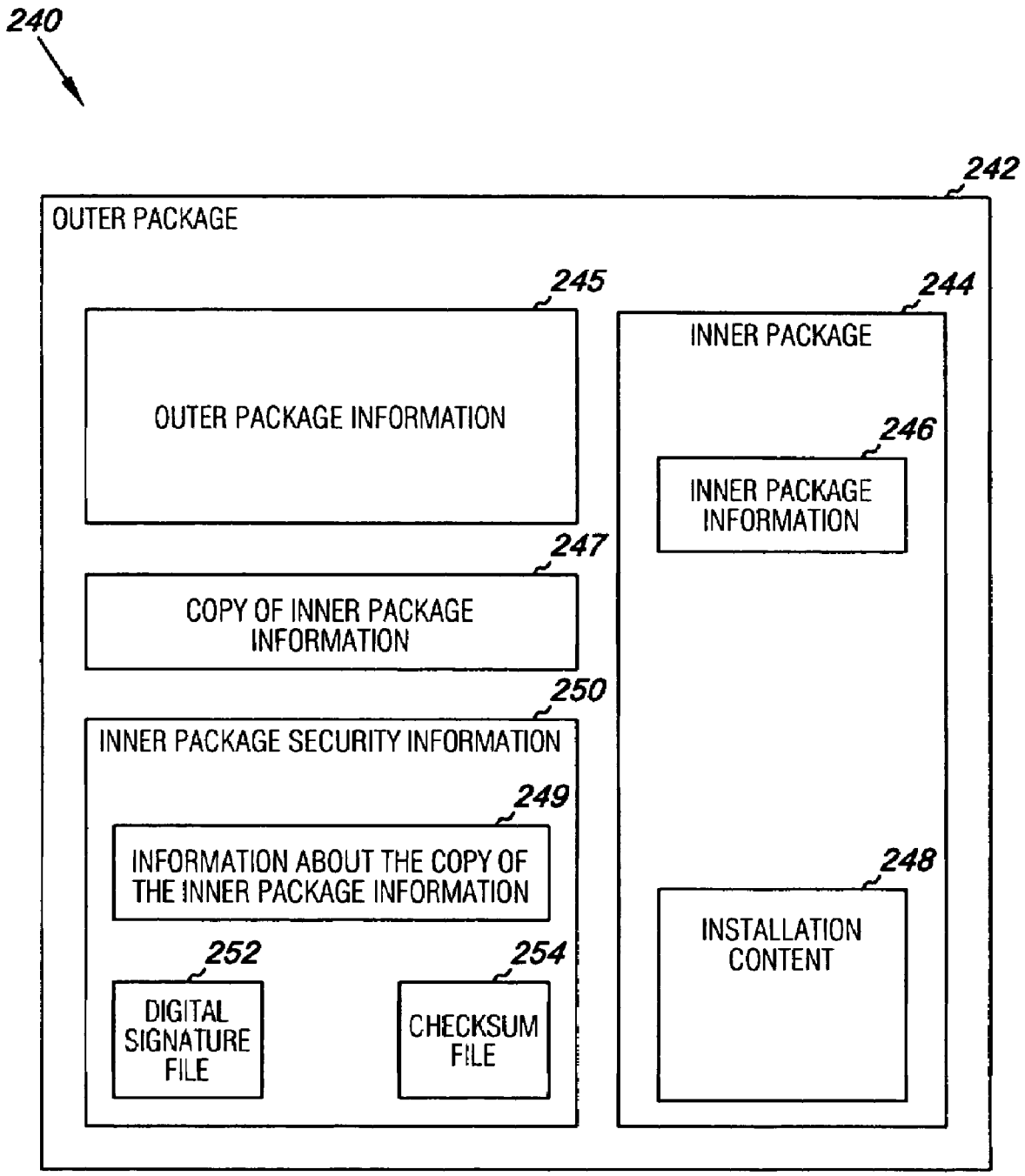
FIG. 2 illustrates a packaging structure embodiment for an instruction set installer.

FIG. 2 illustrates a packaging structure embodiment for an instruction set installer. In the embodiment illustrated in FIG. 2, a package structure 240 is provided having an outer package 242. The outer package can be a compressed or uncompressed file, or a directory structure (e.g., hierarchical directory) of files, for example. The outer package can include a number of items therein.

For example, the outer package can include information such as executable instructions and/or other package functionality information (e.g., outer package information 245) for identifying whether the destination computing device can utilize a particular package functionality (e.g., a security feature of the installer mechanism). This can be accomplished in various manners. For example, the outer package information 245 can include data that can be referenced against information obtained from the destination computing device, such as operating system type and/or version among other information. This data can, for example, indicate which operating system versions and/or types can utilize the particular package functionality (e.g., security information 250) provided in the installation package.

The outer package information 245 can also include data and/or instructions related to configuration of the installation content (e.g., installation content 248), whether the destination computing device will have to be rebooted upon installation of the content 248, and/or various other instructions that can be useful for suitable installation of a package (e.g., inner package 244) and/or installation content 248.

The outer package information 245 can also include information, e.g., meta-data and/or control scripts, which an installer mechanism can use to determine whether to access the security information (e.g., security information 250). In various embodiments, the determination of whether to access the security information can be based on the type and/or version of the installer mechanism, e.g., based on whether the installer mechanism recognizes a particular security feature. For example, some versions of installers and/or software management tools may not have the capability to and/or are not configured to recognize a digital signature that can be checked to verify a package's content.

The outer package information 245 can also include executable instructions to install a set of instructions and/or data (e.g., a program or file, among other data) to be installed on the destination computing device. In some embodiments, the outer package can also include executable instructions to clean up the contents of the installer package once the installation has been completed. Clean up can include the removal of the entire installation package, or the removal of the outer package installation content with the exception of the inner package components within the outer package as will be discussed in more detail below.

The outer package can also include a number of inner package components. In the embodiment illustrated in FIG. 2, the outer package 242 includes an inner package 244 having installation content 248 (e.g., a set of executable instructions, files, programs, and the like) to be installed on the destination computing device, therein. The inner package can be in the form of a compressed file, such as a zip file format among others, or various uncompressed file formats, or a directory structure of files, among other various forms. Also, the installation content 248 can include any number of sets of executable instructions (e.g., files, data, and/or programs) to be installed on a destination computing device.

In the embodiment illustrated in FIG. 2, the inner package 244 includes inner package information 246 that can include executable instructions to perform various operations associated with installing the content 248. The inner package information 246 can include meta-data and/or instructions related to configuration of the installation content 248, whether the destination computing device will have to be rebooted upon installation of the content 248, and/or various other meta-data and/or instructions that can be useful for suitable installation of inner package 244 and/or installation content 248.

The inner package can provide the destination computing device and/or installer mechanism with a secure version of the information to be installed on the destination computing device. As mentioned above, the protection of the inner package (e.g., inner package 244) and/or installation content (e.g., installation content 248) can be accomplished in various manners. For example, encryption, locking, digital signatures, and checksum registration are some examples of suitable security mechanisms. In the embodiment illustrated in FIG. 2, the outer package 242 includes two security mechanisms. A digital signature file 252 and a checksum file 254 are provided within the inner package security information 250. These mechanisms can be used independently or in combination depending upon the embodiment. Further, some embodiments may have one security mechanism and others may have more than two.

As shown in the embodiment illustrated in FIG. 2, the inner package security information 250 can include information 249 about a copy 247 of the inner package information 246. The information 249 can provide an indication/verification that the copy 247 has not been modified and/or tampered with. In various embodiments, instructions can be executed by the installer mechanism to transfer the verified copy 247 to a destination computing device and/or to read the contents of copy 247.

In this manner, the installer can determine the content of inner package information 246 without downloading and/or installing the inner package 244 on the destination computing device. By reading the content of inner package information 246 prior to installing the inner package 244, the installer may be able to determine whether the inner package installation content (e.g., installation content 248) will fit within available memory space on the destination device, whether the destination device requires a reboot, etc.

The outer and/or the inner package can also include clean up instructions for execution after the installation content 248 are installed. Clean up can include removal of the outer package, removal of the entire installation package, or removal of the entire installation package except the installation content 248, for example. Some installation mechanism embodiments contain databases (e.g., of installed packages and their content), and some embodiments can clean up various aspects of these databases.

Various package structure embodiments, such as package structure 240 described in connection with FIG. 2, can be compatible with computing devices and/or installer mechanisms that may or may not have the capability to and/or be configured to utilize a protection mechanism (e.g., a digital signature 252) associated with a set of instructions (e.g., installation content 248) and/or inner package to be installed on a computing device.

For example, as described above, in various embodiments, the package structure 240 can be received to and stored on a computing device. Information (e.g., control scripts) associated with a first package (e.g., outer package 242) can be used by an installer mechanism to install a second package (e.g., an inner package 244) or the contents thereof if the installer does not have the capability of utilizing the protection mechanism prior to installing the inner package on the computing device. For example, the installer may be a prior version or one which is not configured to recognize digital signatures. If the installer has the capability of utilizing the protection mechanism, then the installer mechanism can use the protection mechanism to determine whether the content of the inner package has been modified and/or tampered with prior to installing the inner package and/or its contents.

Embodiments are not limited to the example illustrated in FIG. 2. For instance, in various embodiments, the inner package/outer package structure can be used provide functionalities and/or capabilities other than protection mechanisms and/or security mechanisms while maintaining compatibility with installers that may not have the particular functionality and/or capability and/or are not configured to provide that particular functionality.

Figure 3:
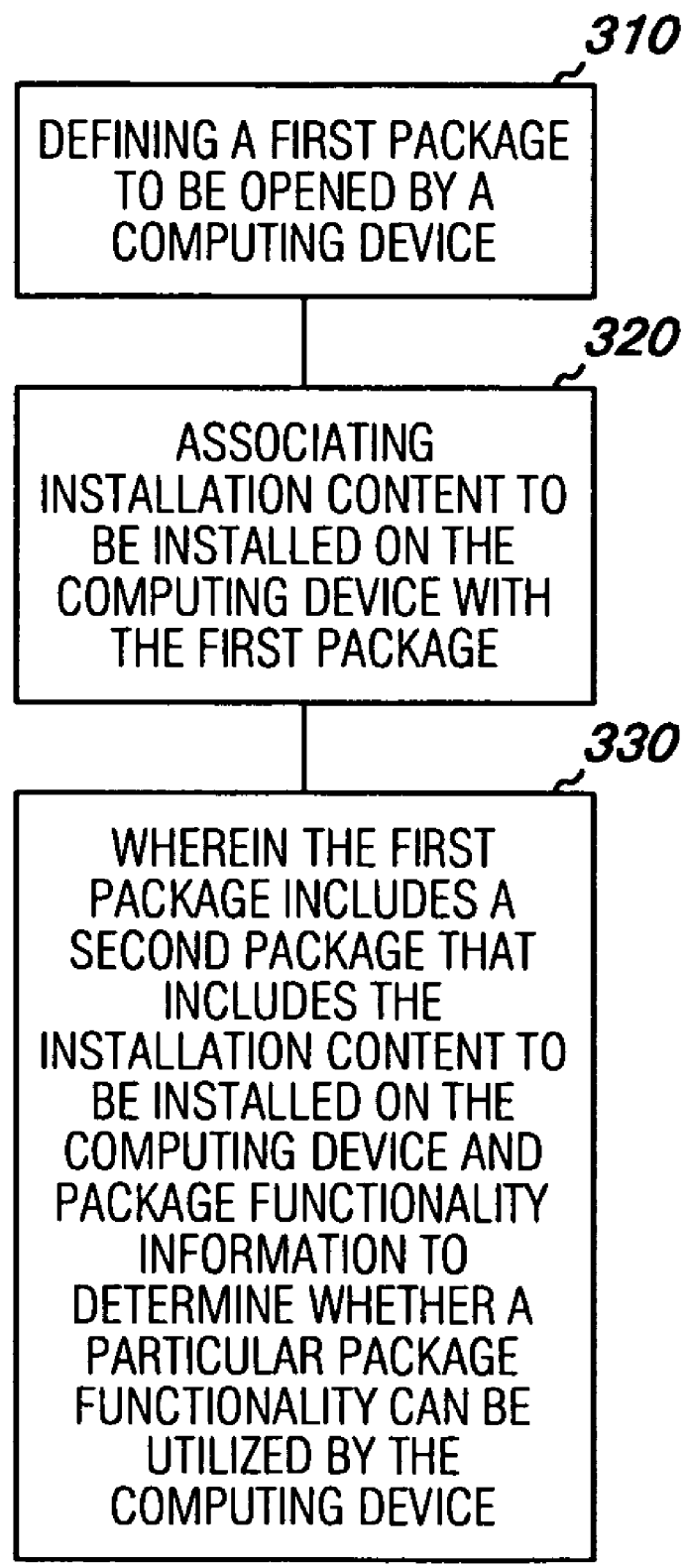
FIG. 3 illustrates a method embodiment of the present disclosure.

FIG. 3 illustrates a method embodiment of the present disclosure. The method includes defining a first package to be opened by a computing device at block 310. As stated above, the first package can be in the form of a compressed file, such as a zip file format among others, or an uncompressed file format. Further, the outer package can include a number of components therein.

The method also includes associating installation content to be installed on the computing device with the first package at block 320. As shown at block 330, in this embodiment, the first package includes a second package that has the installation content to be installed on the computing device. In this embodiment, the first package also includes package functionality information to determine whether a particular package functionality (e.g., a protection mechanism) can be utilized by the computing device.

The embodiments described herein can be performed by logic, hardware, application modules, and the like, to perform the operations described herein and/or resident on the systems and devices shown herein or otherwise. Logic, suitable for carrying out embodiments of the present disclosure, can be resident in one or more devices or locations. Processing modules can include separate modules connected together or include several modules on an application specific integrated circuit (ASIC).

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for providing computing device package compatibility, comprising:
   defining, via a computing device, a first package to be opened by the computing device, the first package having information including:
   package functionality information;
   a second package that includes installation content; and
   a protection mechanism;
   determining using the package functionality information, by the computing device, whether the protection mechanism can be utilized by the computing device; and
   identifying using the protection mechanism, by the computing device, whether the second package has been modified if it is determined that the protection mechanism can be utilized.

2. The method of claim 1, wherein the method includes identifying using the protection mechanism, by the computing device, whether the information of the first package has been modified if it is determined that the protection mechanism can be utilized.

3. The method of claim 1, wherein determining whether the protection mechanism can be utilized by the computing device includes using the package functionality information to determine whether the computing device includes executable instructions to utilize the protection mechanism.

4. The method of claim 3, wherein the method includes:
   utilizing the protection mechanism to restrict access to the second package if it is determined that the computing device has executable instructions to utilize the protection mechanism and if it is identified that the second package has been modified.

5. The method of claim 3, wherein the method includes installing the installation content on the computing device if it is determined that the computing device does not have executable instructions to utilize the protection mechanism.

6. The method of claim 5, wherein using the protection mechanism includes using a checksum routine to identify if the second package has been modified.

7. The method of claim 5, wherein the protection mechanism is selected from a group of protection mechanisms including the mechanisms of: a digital signature of the second package, and a digital signature of a copy of a portion of the second package.

8. A non-transitory computing device readable medium having executable instructions thereon for causing a device to perform a method, comprising:
   defining a first package to be opened by a computing device, the first package having information including:
   package functionality information;
   a second package that includes installation content; and
   security information;
   determining using the package functionality information, by the computing device, whether the security information can be utilized by the computing device; and
   identifying using the security information, by the computing device, whether the second package has been modified if it is determined that the security information can be utilized.

9. The medium of claim 8, wherein the method includes installing the installation content on the computing device and deleting the second package once the installation content is installed.

10. The medium of claim 8, wherein the method includes installing the installation content on the computing device and deleting the first package once the installation content is installed.

11. The medium of claim 8, wherein the method includes identifying using the security information, by the computing device, whether the information of the first package has been modified if it is determined that the security information can be utilized.

12. The medium of claim 8, wherein the method includes associating a checksum file with the security information to determine if the second package has been modified.

13. The medium of claim 12, wherein the method includes reading the checksum file to determine if the content of the second package has been modified.

14. A computing device package structure embodied on a non-transitory computing device readable medium having executable instructions stored thereon, comprising:
   a first package including:
   package functionality information;
   a second package that includes installation content; and
   security information;
   wherein the executable instructions when executed by a computing device cause the computing device to:
   determine, using the package functionality information, whether the security information can be utilized by the computing device; and
   analyze the security information to determine whether the installation content has been modified if it is determined that the security information can be utilized.

15. The package structure of claim 14, wherein the security information is a digital signature of the second package.

16. The package structure of claim 14, wherein the security information includes a checksum protocol to determine whether the installation content have been modified.

17. The package structure of claim 14, wherein the executable instructions comprising the first package includes a set of executable instructions to determine, by the computing device, whether information of the first package has been modified.

18. The package structure of claim 14, wherein the executable instructions comprising the first package includes executable instructions to install the installation content on the computing device if it is determined that the security information can not be utilized by the computing device.

19. The package structure of claim 17, wherein the first package includes executable instructions to cause the computing device to:
   restrict access to the second package if it is determined that the second package has been modified by using the security information and if it is determined that the security information can be utilized by the computing device; and
   install the installation content on the computing device if it is determined that the second package has not been modified and if it is determined that the security information can be utilized by the computing device.

20. An executable instruction set installer embodied on a non-transitory computing device readable medium having executable instructions stored thereon, comprising:
   a first set of executable instructions executable on a computing device to cause the computing device to:
   retrieve a first package having package functionality information and security information from a memory location;
   determine, using the package functionality information, whether the computing device has executable instructions to utilize the security information;

determine whether the first package has been modified if it is determined that the computing device has executable instructions to utilize the security information; and determine, using the security information, whether a second package within the first package has been modified if it is determined that the computing device has executable instructions to utilize the security information.

21. The instruction set installer of claim 20, wherein the security information is an encrypted checksum of the second package.

22. The instruction set installer of claim 20, wherein the first package includes a second set of executable instructions cause the computing device to install the second package on the computing device if it is determined that the computing device does not have executable instructions to utilize the security information.

23. The instruction set installer of claim 22, wherein the second set of executable instructions is a script.

24. The instruction set installer of claim 20, wherein the first package includes a second set of executable instructions to cause the computing device to install the second package on the computing device if it is determined that the second package has not been modified and if it is determined that the computing device does have executable instructions to utilize the security information.

25. The instruction set installer of claim 20, wherein the first package includes a second set of executable instructions to cause the computing device to restrict access to the second package if it is determined that the second package has been modified and if it is determined that the computing device does have executable instructions to utilize the security information.

* * * * *

UNITED STATES PATENT AND TRADEMARK OFFICE
CERTIFICATE OF CORRECTION

PATENT NO. : 8,171,469 B2
APPLICATION NO. : 11/504480
DATED : May 1, 2012
INVENTOR(S) : Ian A. Elliott Page 1 of 1

It is certified that error appears in the above-identified patent and that said Letters Patent is hereby corrected as shown below:

In column 12, line 37, in Claim 17, delete "whether" and insert -- whether the --, therefor.

Signed and Sealed this
Twelfth Day of February, 2013

Teresa Stanek Rea
*Acting Director of the United States Patent and Trademark Office*